(12) United States Patent
Searfoss

(10) Patent No.: US 6,659,531 B2
(45) Date of Patent: Dec. 9, 2003

(54) REBALANCING CIRCUIT FOR A TRUCK COVER SLIDING PIVOT

(76) Inventor: Timothy K. Searfoss, 1282 East M-55, West Branch, MI (US) 48661

( * ) Notice: Subject to any disclaimer, the term of this patent is extended or adjusted under 35 U.S.C. 154(b) by 0 days.

(21) Appl. No.: 09/901,469

(22) Filed: Jul. 9, 2001

(65) Prior Publication Data
US 2002/0014780 A1 Feb. 7, 2002

Related U.S. Application Data

(63) Continuation-in-part of application No. 09/181,323, filed on Oct. 20, 1998, now Pat. No. 6,257,646.

(51) Int. Cl.$^7$ .................................................. B60P 7/04
(52) U.S. Cl. ...................... 296/100.17; 296/98; 60/424; 60/426; 60/403; 91/517
(58) Field of Search ............................. 296/98, 100.15, 296/100.01, 100.17; 160/74; 92/117 R, 66; 91/515, 154, 166, 171, 416, 517, 518, 446, 440; 60/403, 406, 424, 426

(56) References Cited

U.S. PATENT DOCUMENTS

| | | | | |
|---|---|---|---|---|
| 2,922,399 A | * | 1/1960 | Panissidi et al. | 92/117 R |
| 3,760,688 A | * | 9/1973 | Dummer | 91/515 |
| 3,772,966 A | * | 11/1973 | Mills | 92/117 R |
| 4,344,733 A | * | 8/1982 | Hirsch | 414/694 |
| 4,456,077 A | * | 6/1984 | Lagerstedt et al. | 92/117 R |
| 4,759,262 A | * | 7/1988 | Hay, II | 92/67 |
| 4,827,719 A | * | 5/1989 | Paoluccio | 60/478 |
| 4,874,196 A | * | 10/1989 | Goldstein et al. | 160/71 |
| 5,031,955 A | | 7/1991 | Searfoss | |
| 5,238,287 A | | 8/1993 | Haddad, Jr. | |
| 5,292,169 A | | 3/1994 | O'Brian | |
| 5,524,953 A | | 6/1996 | Shaer | |
| 5,752,735 A | | 5/1998 | Fleming et al. | |
| 6,257,646 B1 | | 7/2001 | Searfoss | |

* cited by examiner

Primary Examiner—Joseph D. Pape
Assistant Examiner—Jason Morrow
(74) Attorney, Agent, or Firm—Cardinal Law Group

(57) ABSTRACT

A hydraulic circuit comprises first and second cylinders, and a piston disposed in each of the cylinders. A pump communicates with one side of one of the pistons, and a pressure relief valve has a position wherein the pump communicates with another side of the one piston and with the other piston.

20 Claims, 4 Drawing Sheets

REBALANCING CIRCUIT FOR A TRUCK COVER SLIDING PIVOT

RELATED APPLICATION

This application is a C-I-P and claims priority from U.S. application Ser. No. 09/181,323 filed on Oct. 20, 1998, now U.S. Pat. No. 6,257,646, the entire disclosure of which is incorporated herein by reference.

TECHNICAL FIELD

This invention relates to covers for truck beds, and more particularly to a rebalancing valve for a truck cover sliding pivot.

BACKGROUND ART

Many trucks, particularly those hauling loose loads such as sand and gravel, need a truck cover to prevent the wind from blowing load particles off the load bed. Various apparatus have been devised for covering a truck load. Some such apparatus include a motor for selectively winding a flexible cover. My U.S. Pat. No. 5,031,955 provides a truck cover which may be conveniently motor operated from the cab of a truck while simultaneously extending the cover over the truck bed and pressing down on the front of the cover proximate a winding assembly which winds up the cover at the front of the truck bed. Similarly, U.S. Pat. No. 5,238,287 shows a front mount telescopic arm truck cover system, and U.S. Pat. No. 5,524,953 shows a contractable vehicle bed cover assembly with an extendable closure.

Container trucks, however, present special problems. In particular, such container trucks tend to have differently sized beds, and are required to accept containers of different dimensions. To accommodate these variances, the arms normally used in conventional truck bed covers have to be long enough to reach from their mounting point to both the front and rear ends of the truck bed. U.S. Pat. No. 5,292,169 shows such a truck container cover. Not only do such arms require great effort to move from either their forwardmost or rearwardmost position, but they are not able to efficiently accommodate containers of different sizes.

U.S. Pat. No. 5,752,735 shows one attempt to address at least this latter problem with adjustable pivot points shifted along opposite rails by hydraulic cylinders.

SUMMARY OF THE INVENTION

The present invention is a hydraulic circuit comprising first and second cylinders, and a piston disposed in each of the cylinders. A pump communicates with one side of one of the pistons, and a pressure relief valve has a position wherein the pump communicates with another side of the one piston and with the other piston. This circuit is particularly applicable to covers for trucks with cylinders disposed on opposite sides of the truck.

Accordingly, an object of this invention is to provide a truck cover that requires a smaller clearance than conventional truck covers.

Still another object of this invention is to provide a truck cover that is suitable for use with container trucks.

Still another object of this invention is to provide a truck cover bow that has adjustable pivots.

Still another object of this invention is to provide a hydraulic circuit of the type described above which rebalances the force applied to adjust the pivots.

These and other objects, features, and advantages of the present invention are readily apparent from the following detailed description of the best mode for carrying out the invention when taken in conjunction with the accompanying drawings.

BRIEF DESCRIPTION OF THE DRAWINGS

FIG. 4 is a perspective view of a sliding pivot of the apparatus; and

BEST MODE FOR CARRYING OUT THE INVENTION

Figure 1:
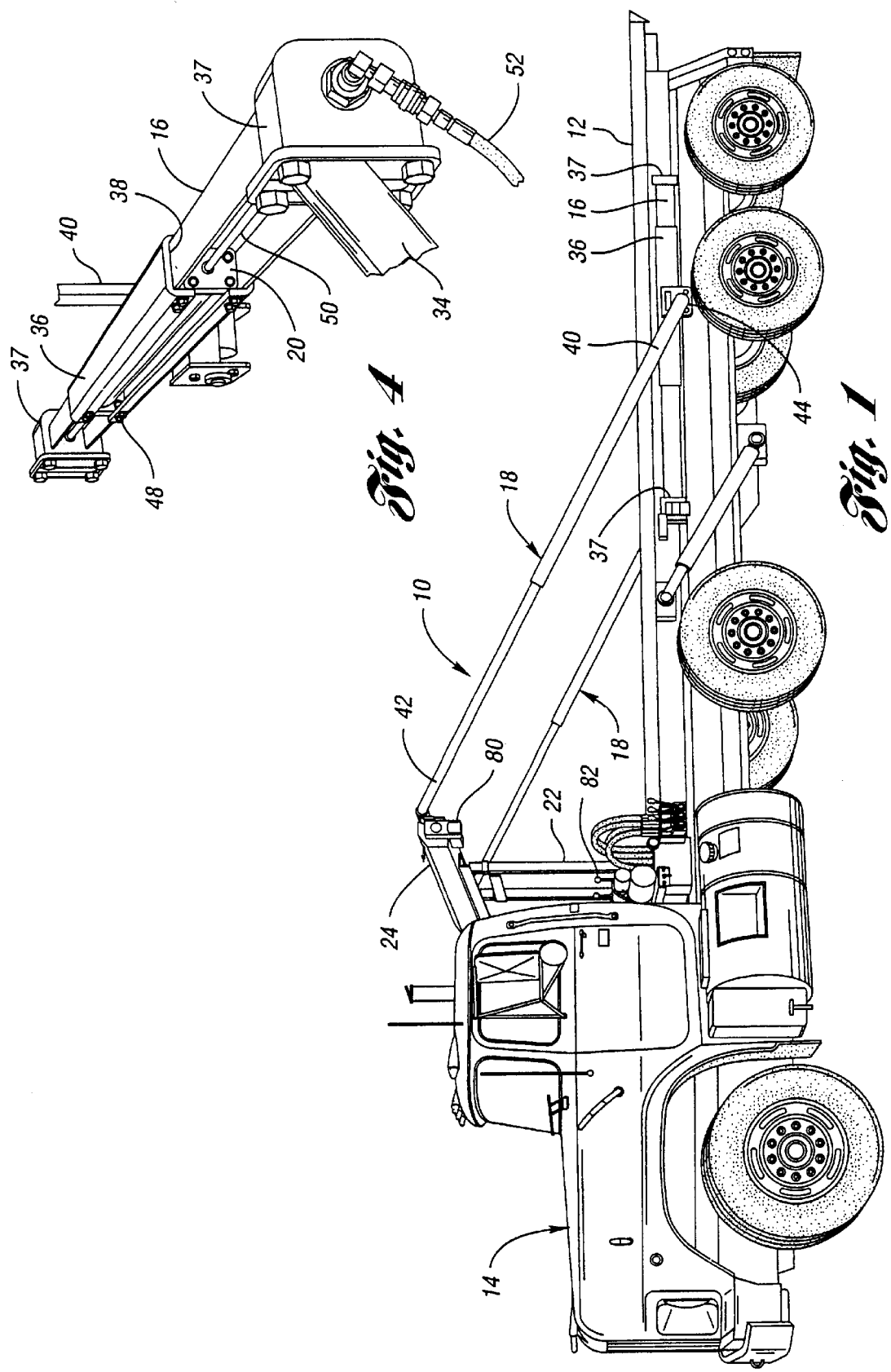
FIG. 1 is a perspective view of a truck including an apparatus for moving a cover over a bed of the truck.

With reference to the drawings, the preferred embodiments of the present invention will be described. FIGS. 1–4 show an apparatus 10 for covering a bed 12 of a truck 14. While the truck is shown unloaded, it should be appreciated that the present invention contemplates that a container or other load is carried on the bed 12. The apparatus 10 comprises a pair of inner rails 16, a pair of bows 18, and a pair of cylinders 20.

Figure 2:
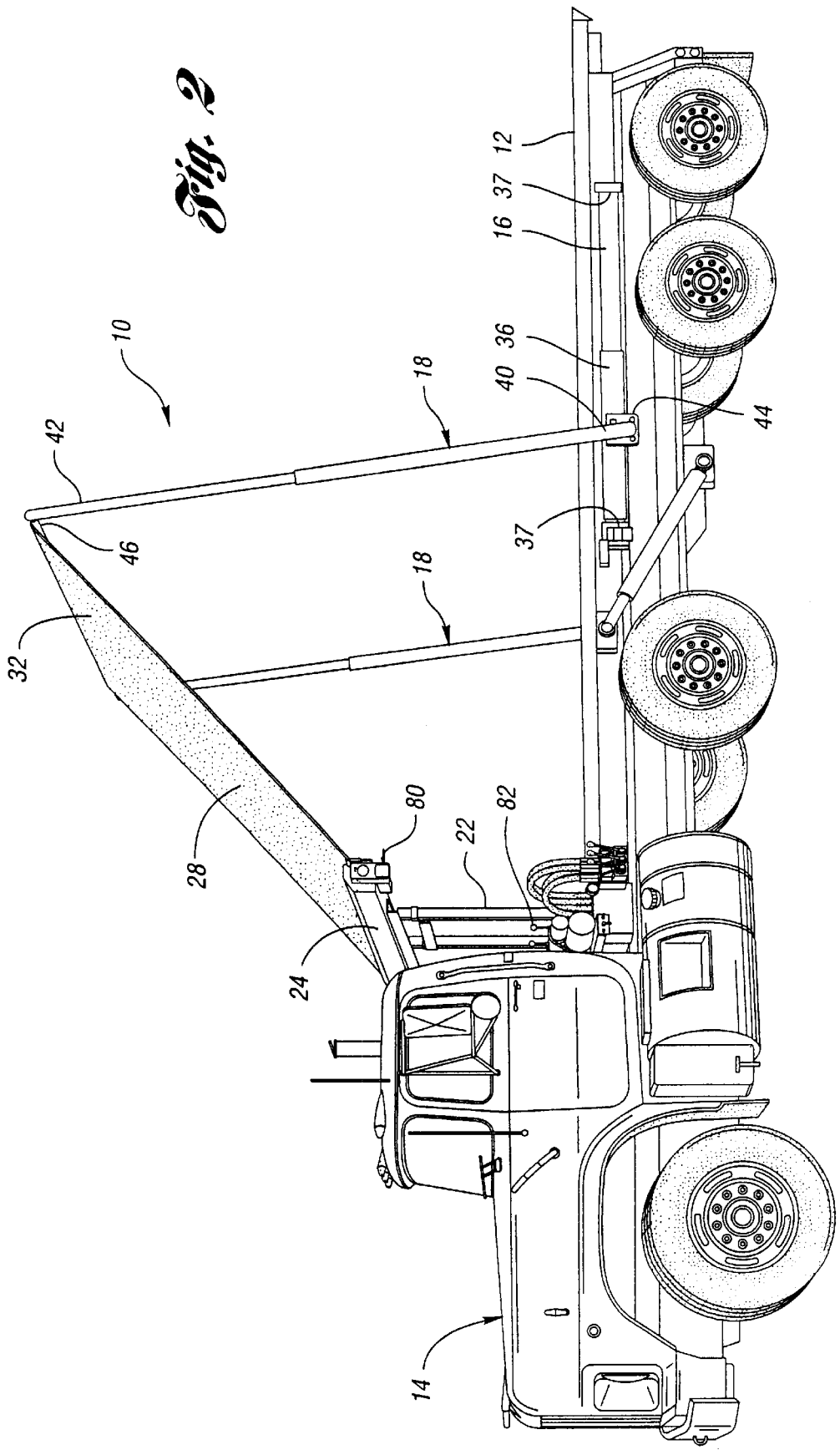
FIG. 2 is a perspective view of the truck with the apparatus in an intermediate position.
Figure 3:
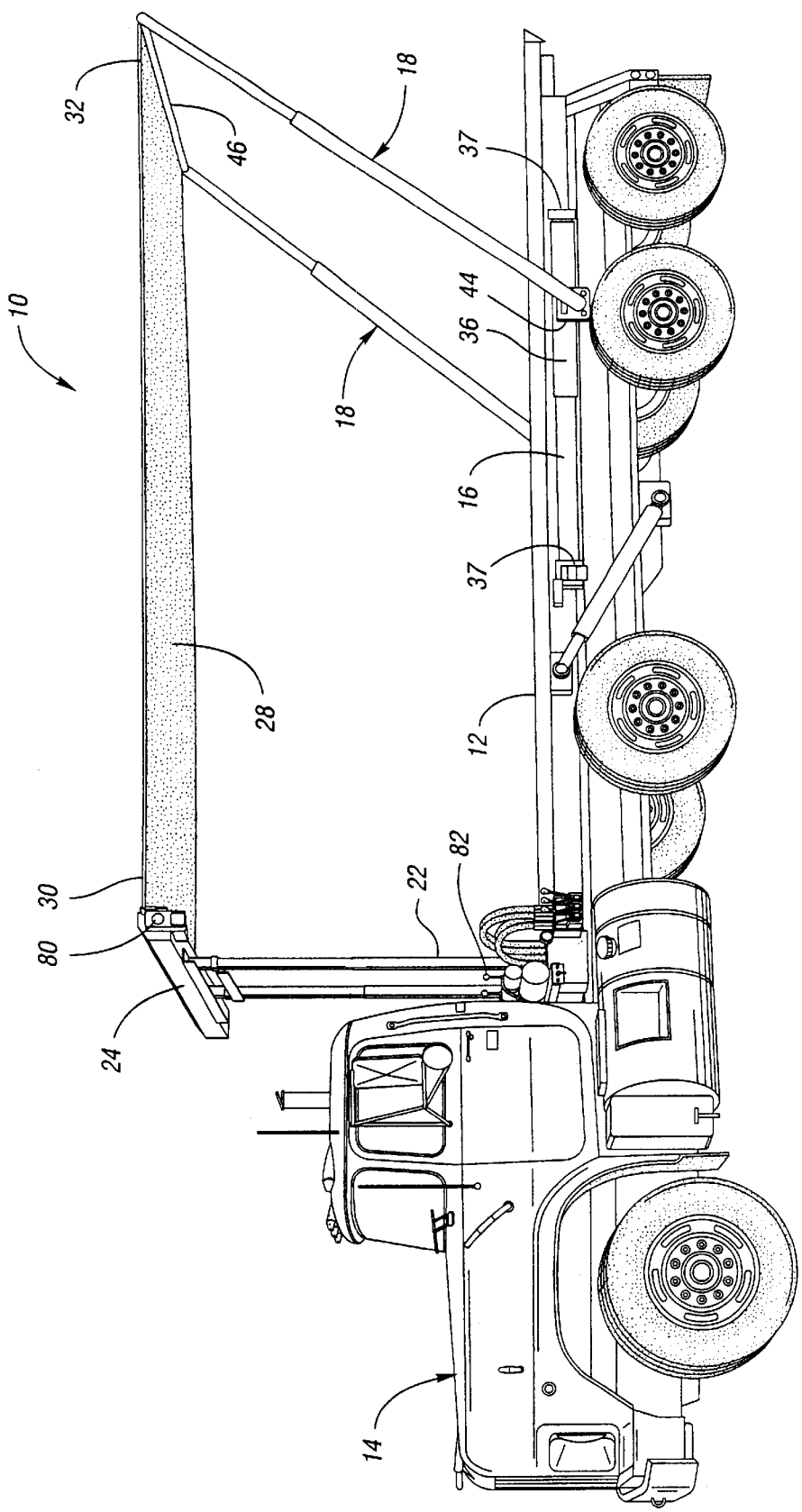
FIG. 3 is a perspective view of the truck with the apparatus in a further intermediate position.

A tower 22 is disposed proximate the front of the truck bed 12, and is hydraulically movable as is well known between a lowered position shown in FIGS. 1–2 and a raised position shown in FIG. 3. The tower 22 carries a head assembly 24 which includes a spool rotatably mounted within the head assembly. A preferably flexible, cloth or tarpaulin cover 28 is windable on the spool, with a first end 30 connected to the spool and a distal second end 32 as best shown in FIG. 3.

The inner rails 16 are preferably elongated aluminum extrusions mounted in a generally horizontal orientation proximate the left and right sides, respectively, of the truck bed 12. The inner rails 16 may be connected by extension 34 or otherwise to the truck frame or fenders, and are advantageously situated slightly below the level of the truck bed 12. An outer rail or follower 36 cooperates with each of the inner rails 16 and is slidable or otherwise adjustable therealong between front and rear stops 37. To facilitate this movement, the rail assemblies may each be provided with a friction-reducing bushing 38 shown in FIG. 4. The bushings 38 are disposed between the inner and outer rails 16 and 36, respectively, and are connected to the outer rails to be movable therewith. The bushings 38 preferably comprise a polymeric material such as acrylonitrile-butadiene-styrene (ABS).

The bows 18 are preferably formed of fabricated or extruded aluminum or steel alloy, and are disposed proximate the opposite sides of the truck bed 12. The bows 18 each have a lower end 40 and an upper end 42. The lower end 40 of each bow 18 pivotably cooperates with an associated outer rail 36, preferably through a hinge 44 as described in my U.S. Pat. No. 5,887,937, the disclosure of which is hereby incorporated by reference. The upper end 42 of each bow is connected to the distal end 32 of the cover 28, preferably by way of a transverse bow member 46.

FIG. 4 shows that the cylinders 20 are disposed generally inside the generally rectangular in cross-section inner rails 16. Each cylinder 20 is connected to an associated outer rail 36, by bolts 48 or otherwise, and is movable along a rod 50 that is preferably fixed with respect to the truck. Automatic transmission fluid, oil or other fluid fed through hydraulic lines 52 and the rod 50 and into the cylinders 20 moves the cylinders either forwardly or rearwardly along the rods. Because the inner rails 16 each define an axis, and the inner rails lie generally in the same plane, the cylinders 20 develop a force along the plane defined by the inner rails to slide the followers 36 and the second ends 40 of the bows 18 along the inner rails.

Figure 5:
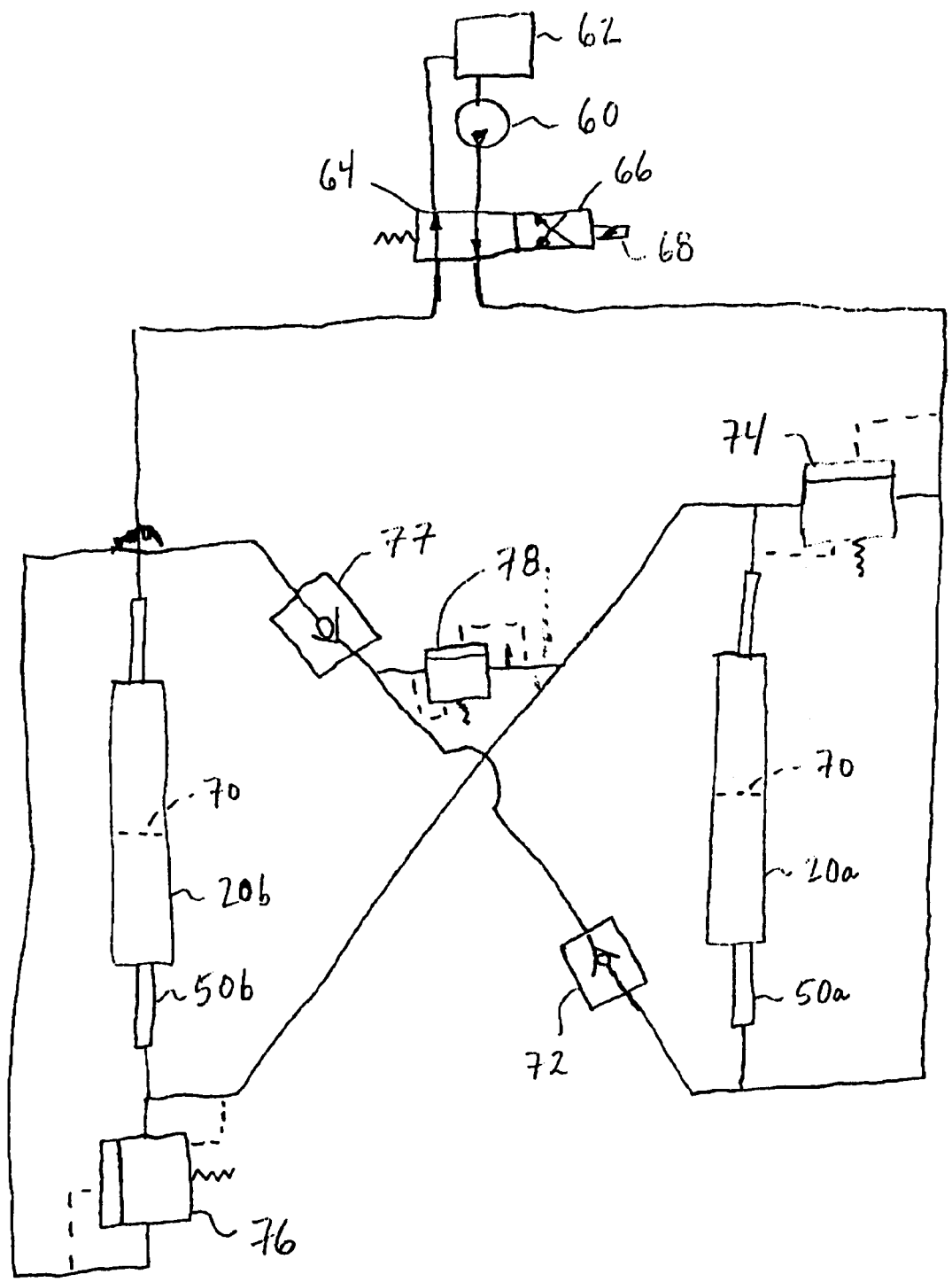
FIG. 5 is a schematic view of a hydraulic circuit of the apparatus.

FIG. 5 schematically shows the layout of the hydraulic circuit. A pump 60, preferably electrically powered so that the truck hydraulics are not disturbed, draws fluid from a reservoir 62. With a valve 64 in the position shown, the pump 60 forces fluid through the lower end of the right side rod 50a. This action causes the right side cylinder 20a to shift upwardly as shown in FIG. 5, and displaces a like amount of fluid out through the upper end of the right side rod 50a and into the lower end of the left side rod 50b. This action in turn forces the left side cylinder 20b to likewise shift upwardly, displacing a like amount of fluid out the upper end of left side rod 50b, back through the valve 64 and into the reservoir 62. The resulting synchronized movement of the cylinders also simultaneously shifts the outer rails 36, and the lower ends 40 of the bows 18 fixed thereto. To reverse this movement, the valve 64 is simply shifted to a second position 66 by a solenoid 68, a stepper motor or other automatic or manual means of adjusting the valve. A particular advantage of this closed loop design is that the cylinders 20 have the same cross-section, and the pistons 70 fixed to the rods 50 within the cylinders have the same effective cross-sectional area. The pump 60 may also drive the tower hydraulics through a different valve and circuit.

In the event that one of the cylinders encounters and end-of-travel stop before the other cylinder does so, or one of the cylinders otherwise becomes jammed, the hydraulic circuit resynchronizes the cylinders. If for example the right side cylinder 20a becomes jammed when moving upwardly as shown in FIG. 5, pressure builds behind a check valve 72 until it activates a relief valve 74. In a preferred embodiment, the pressure relief valve 74 is activated at a pressure differential of about 1800 psi. Once the relief valve 74 is open, fluid pressure from the pump is directed to the upper end of the right side cylinder 20a and to the lower end of the left side cylinder 20b. The cylinders are thus forced in opposite directions until they are generally in phase again, at which time the line pressures equalize and the valve 74 closes. A pressure relief valve 76 and an associated check valve 77 operate in the same manner if the valve 66 is active. A pressure relief valve 78, preferably operable at about 1600 psi, ensures a fluid path in case both cylinders are immovable as might happen when they both reach their end-of-travel limits.

A motor 80 is provided to drive the spool to wind the cover 28 against the rearward bias normally developed on the bows by the pivot mounting 44. The motor is preferably a direct drive electric gear motor as described in my U.S. Pat. No. 5,829,819, the disclosure of which is hereby incorporated by reference. Through a series of hand-operated controls 82, each bow 18 is thus slidable and pivotable to move the cover 28 over the bed 12 of the truck from a retracted position shown in FIG. 1 proximate the front end of the bed to an extended position shown in FIG. 3 proximate the rear end of the bed. In particular, the tower 22 assumes its fully raised position to minimize interference of the load or container with the travel of the cover. After reaching the extended position, the tower 22 can be lowered, and the outer rails 36 slid forward slightly, to draw the cover tightly over the load or container on the truck bed 12.

Preferably, the tower to outer rail travel ratio is in the range of about 3:4. It should also be appreciated that a tension bow may be provided for applying a downward force to the cover proximate the front end of the load bed to facilitate holding the cover proximate the load or container. Further details of this arrangement may be found in my U.S. Pat. No. 5,031,955, the disclosure of which is hereby incorporated by reference.

It should be understood that while the forms of the invention shown and described above constitute preferred embodiments of the invention, they are not intended to illustrate all possible forms thereof. For instance, the present invention is applicable to resynchronize hydraulic cylinders in a variety of other applications including those on trucks. It should also be understood that the words used are words of description rather than limitation, and various changes may be made without departing from the spirit and scope of the invention disclosed.

What is claimed is:

1. An apparatus for moving one and an other cylinders disposed on opposite sides of a truck, the apparatus comprising:
    a pump adapted to pump fluid to one end of the one of the cylinders; and
    a pressure relief valve in communication with the pump and having a first position wherein the pump is adapted to pump fluid through the pressure relief valve to another end of the one cylinder and to the other cylinder.

2. The apparatus of claim 1 wherein the one cylinder cooperates with a rod, and the rod communicates with the pump to move the one cylinder relative to the rod.

3. The apparatus of claim 1 wherein the one cylinder cooperates with a rod, and the rod has first and second ends in communication with the pump to move the one cylinder relative to the rod.

4. The apparatus of claim 1 further comprising a second relief valve in communication with the pump and having a position wherein the pump communicates with the other end of the one cylinder and the other cylinder.

5. The apparatus of claim 1 further comprising at least one check valve in communication between the cylinders.

6. The apparatus of claim 1 wherein the pump communicates with a rearward end of the other cylinder when the pressure relief valve is in the first position.

7. The apparatus of claim 1 wherein the other end of the one cylinder is a forward end.

8. A hydraulic circuit comprising:
    first and second cylinders;
    a piston disposed in each of the cylinders;
    a pump adapted to pump fluid to one side of one of the pistons; and
    a pressure relief valve having a first position wherein the pump communicates through the pressure relief valve with another side of the one piston and with the other piston.

9. The apparatus of claim 8 wherein each piston cooperates with a rod, and the cylinders move relative to their associated rod.

10. The apparatus of claim 8 wherein each piston cooperates with a rod, and each rod has first and second ends in communication with the pump to move an associated cylinder relative to the rod.

11. The apparatus of claim 8 further comprising a second relief valve having a position wherein the pump communicates with the other side of the one piston and with the other piston.

12. The apparatus of claim 8 further comprising at least one check valve in communication between the cylinders.

13. The apparatus of claim 8 wherein the pump communicates with a rearward side of the other piston when the pressure relief valve is in the first position.

14. The apparatus of claim 8 wherein the other side of the one piston is a forward side.

15. An apparatus for moving a cover over a bed of a truck, the apparatus comprising:
- a pair of bows, each bow having a first end connected to a cylinder and a second end connected to the cover;
- a pump adapted to pump fluid to one end of one of the cylinders; and
- a pressure relief valve in communication with the pump and having a first position wherein the pump is adapted to pump fluid through the pressure relief valve to another end of the one cylinder and to the other cylinder.

16. The apparatus of claim 15 wherein the one cylinder cooperates with a rod, and the rod communicates with the pump to move the one cylinder relative to the rod.

17. The apparatus of claim 15 wherein the one cylinder cooperates with a rod, and the rod has first and second ends in communication with the pump to move the one cylinder relative to the rod.

18. The apparatus of claim 15 further comprising a second relief valve in communication with the pump and having a position wherein the pump communicates with the other end of the one cylinder and with the other cylinder.

19. The apparatus of claim 15 further comprising at least one check valve in communication between the cylinders.

20. The apparatus of claim 15 wherein the pump communicates with a rearward end of the other cylinder when the pressure relief valve is in the first position.

\* \* \* \* \*